United States Patent
Asao et al.

[11] Patent Number: 5,903,084
[45] Date of Patent: May 11, 1999

[54] ROTOR FOR DYNAMO-ELECTRIC MACHINE

[75] Inventors: Yoshihito Asao; Yoshihiro Shinosaka, both of Tokyo, Japan

[73] Assignee: Mitsubishi Denki Kabushiki Kaisha, Tokyo, Japan

[21] Appl. No.: 09/044,996

[22] Filed: Mar. 20, 1998

[30] Foreign Application Priority Data

Oct. 27, 1997 [JP] Japan .................................. 9-294555

[51] Int. Cl.⁶ .............................. H02K 1/22; H02K 5/24
[52] U.S. Cl. ............................................. 310/263; 310/51
[58] Field of Search ........................................ 310/263, 57

[56] References Cited

U.S. PATENT DOCUMENTS

| | | | |
|---|---|---|---|
| 3,445,694 | 5/1969 | Campbell et al. | 310/51 |
| 5,780,953 | 7/1998 | Umeda et al. | 310/263 |

FOREIGN PATENT DOCUMENTS 7-123664   5/1995   Japan .

*Primary Examiner*—Nestor Ramirez
*Assistant Examiner*—Dane Dinh Le
*Attorney, Agent, or Firm*—Sughrue, Mion, Zinn Macpeak & Seas, PLLC

[57] ABSTRACT

A rotor for a dynamo-electric machine is capable of reducing the leakage of magnetic flux between triangular magnetic poles, making it possible to protect magnets disposed between the triangular magnetic poles from damage. The rotor is equipped with: a rotor coil through which current flows to generate magnetic flux; a field core which is provided such that it covers the rotor coil and which is composed of a first field core member and a second field core member having a triangular magnetic poles, respectively; a plurality of magnets which are disposed between adjacent triangular magnetic poles and which have been magnetized in a direction so as to reduce the leakage of the magnetic flux between the triangular magnetic poles. Each magnet is constituted by a first magnet section secured by a securing means to the triangular magnetic pole of the first field core member and a second magnet section secured by a securing means to the triangular magnetic pole of the second field core member.

5 Claims, 9 Drawing Sheets

ROTOR FOR DYNAMO-ELECTRIC MACHINE

BACKGROUND OF THE INVENTION

1. Field of the Invention

The present invention relates to a rotor for a dynamo-electric machine, the rotor being equipped with magnets provided between adjacent triangular magnetic poles to reduce the leakage of magnetic flux between the triangular magnetic poles.

2. Description of Related Art

FIG. 12 is a sectional side elevation of a conventional vehicular AC generator; and FIG. 13 is a perspective view of a rotor shown in FIG. 12. The AC generator is equipped with: a case 3 comprised of a front bracket 1 and a rear bracket 2 made of aluminum; a shaft 6 which is provided in the case 3 and which has a pulley 4 fixed at one end thereof; a Randell-type rotor 7 secured to the shaft 6; fans 5 secured to both side surfaces of the rotor 7; a stator 8 secured to the inner wall surface of the case 3; a slip ring 9 which is secured to the other end of the shaft 6 and which supplies current to the rotor 7; a pair of brushes 10 in sliding contact with the slip ring 9; a brush holder 11 which holds the brushes 10; a rectifier 12 which is electrically connected to the stator 8 to rectify alternating current generated in the stator 8 to direct current; a heat sink 17 fitted onto the brush holder 11; and a regulator 18 which is bonded to the heat sink 17 to adjust the magnitude of the AC voltage generated in the stator 8.

The rotor 7 is constituted by a rotor coil 13 through which current flows to generate magnetic flux, and a field core assembly 14 which is provided such that it covers the rotor coil 13 and in which magnetic poles are formed by the magnetic flux. The field core assembly 14 is composed of a pair of first field core member 21 and second field core member 22 which are alternately meshed. The first field core member 21 and the second field core member 22 are made of iron; the first field core member 21 has triangular magnetic poles 23, and the second field core member 22 has triangular magnetic poles 24. A hexahedral magnet 19 which has been magnetized in a direction so as to reduce the leakage of the magnetic flux between triangular magnetic poles 23 and 24 is secured at each pair of adjacent triangular magnetic poles 23 and 24.

The stator 8 is provided with a stator core 15, and a stator coil 16 which is composed of a conductor wound around the stator core 15 and in which alternating current is generated as the magnetic flux from the rotor coil 13 changes as the rotor 7 rotates.

In the vehicular AC generator configured as set forth above, current is supplied from a battery, not shown, to the rotor coil 13 via the brushes 10 and the slip ring 9 so as to generate magnetic flux; the triangular magnetic poles 23 of the first field core member 21 are magnetized to the N pole, while the triangular magnetic poles 24 of the second field core 22 are magnetized to the S pole. The pulley 4 is driven by an engine and the rotor 7 is rotated through the shaft 6, so that a rotary magnetic field is supplied to the stator coil 16, thus generating an electromotive force in the stator coil 16. This AC electromotive force is rectified into direct current through the rectifier 12 and the magnitude thereof is adjusted by the regulator 18 before it is supplied to the battery.

In the conventional vehicular AC generator, when the AC voltage is generated in the stator coil 16 as the rotor 7 rotates, a constant magnetic repulsion is generated between the outer peripheral surface of the rotor 7 and the inner peripheral surface of the stator 8; hence, vibration is apt to take place in the directions indicated by arrows A to the triangular magnetic poles 23 and 24 as shown in FIG. 14. Thus, there has been a problem in that a load applied to the triangular magnetic poles 23 and 24 causes the magnets 19, which have been secured to the triangular magnetic poles, to also be subjected to a load. This causes the magnet 19 to be distorted, and perhaps damaged.

SUMMARY OF THE INVENTION

The present invention has been made with a view toward solving this problem, and it is an object of the invention to provide a rotor for a dynamo-electric machine, which is capable of preventing distortion and damage to magnets disposed between triangular magnetic poles to reduce the leakage of magnetic flux between the triangular magnetic poles.

To this end, according to the present invention, there is provided a rotor for a dynamo-electric machine, which rotor being constructed by: a rotor coil through which current flows to generate magnetic flux; a field core assembly which is provided such that it covers the rotor coil and which is composed of a first field core member and a second field core member respectively having triangular magnetic poles alternately meshed with each other; and a plurality of magnets which are disposed between adjacent triangular magnetic poles and which are magnetized in directions so as to reduce the leakage of the magnetic flux between these triangular magnetic poles; wherein each magnet is comprised of a first magnet section secured by a securing means to the triangular magnetic pole of the first field core member, and a second magnet section secured by a securing means to the triangular magnetic pole of the second field core member.

In a preferred form of the rotor of the dynamo-electric machine, the distal end of the second magnet section secured to the second field core member is adjacent to the base portion of the triangular magnetic poles of the first field core member, while the distal end of the first magnet section secured to the first field core member is adjacent to the base portion of the triangular magnetic poles of the second field core member.

In another preferred form of the rotor of the dynamo-electric machine, the securing means is comprised of a protuberance serving as the engaging portion and a recessed portion serving as the mating portion to be meshed with the aforesaid engaging portion.

In yet another preferred form, the outer peripheral surface of the rotor of the dynamo-electric machine is wrapped with a nonmagnetic tape.

In a further preferred form of the rotor of the dynamo-electric machine, the tape employs carbon fiber as a base material and is impregnated with resin.

DESCRIPTION OF THE PREFERRED EMBODIMENTS

Figure 12:
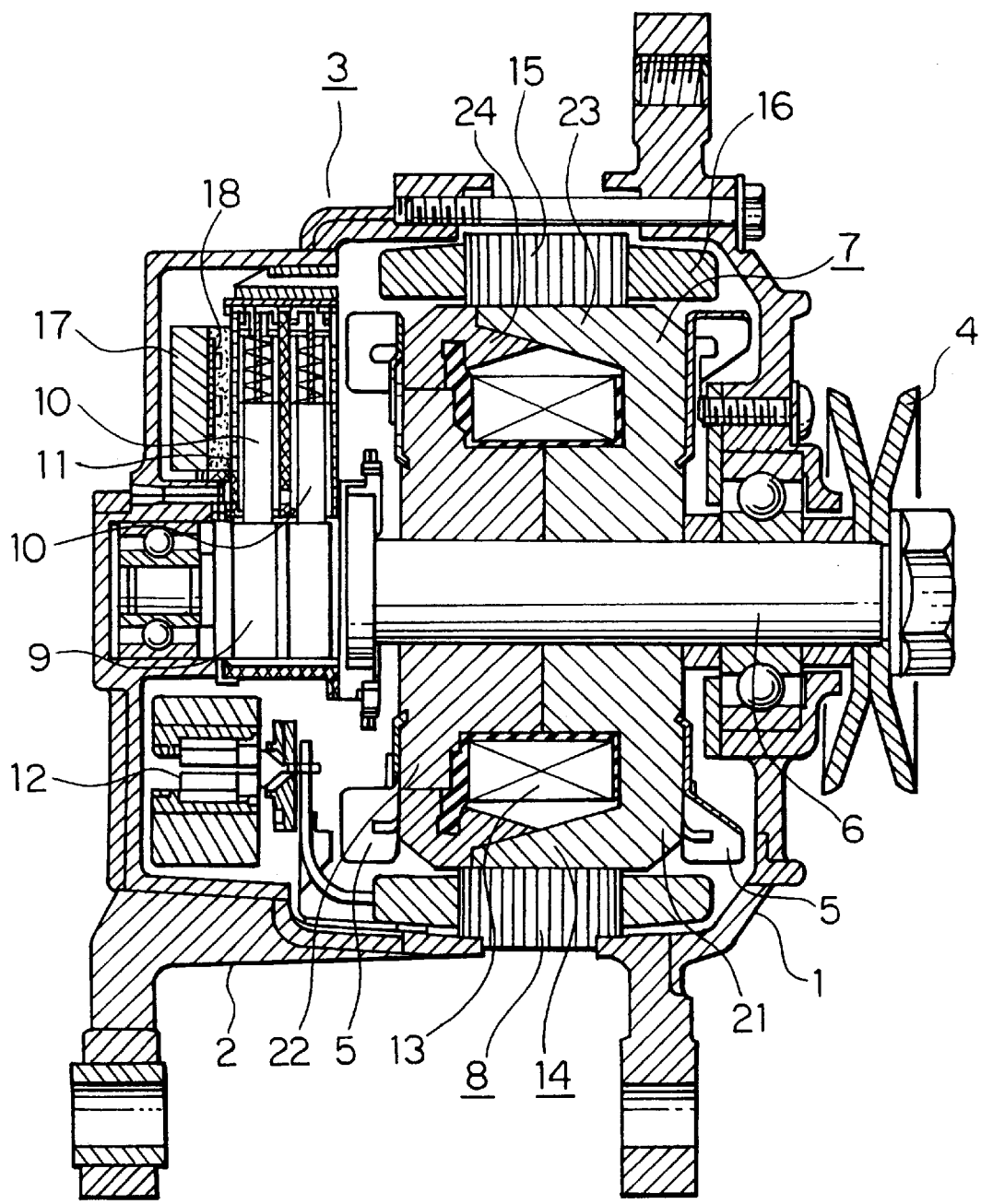
FIG. 12 is a sectional view illustrating a conventional vehicular AC generator.
Figure 13:
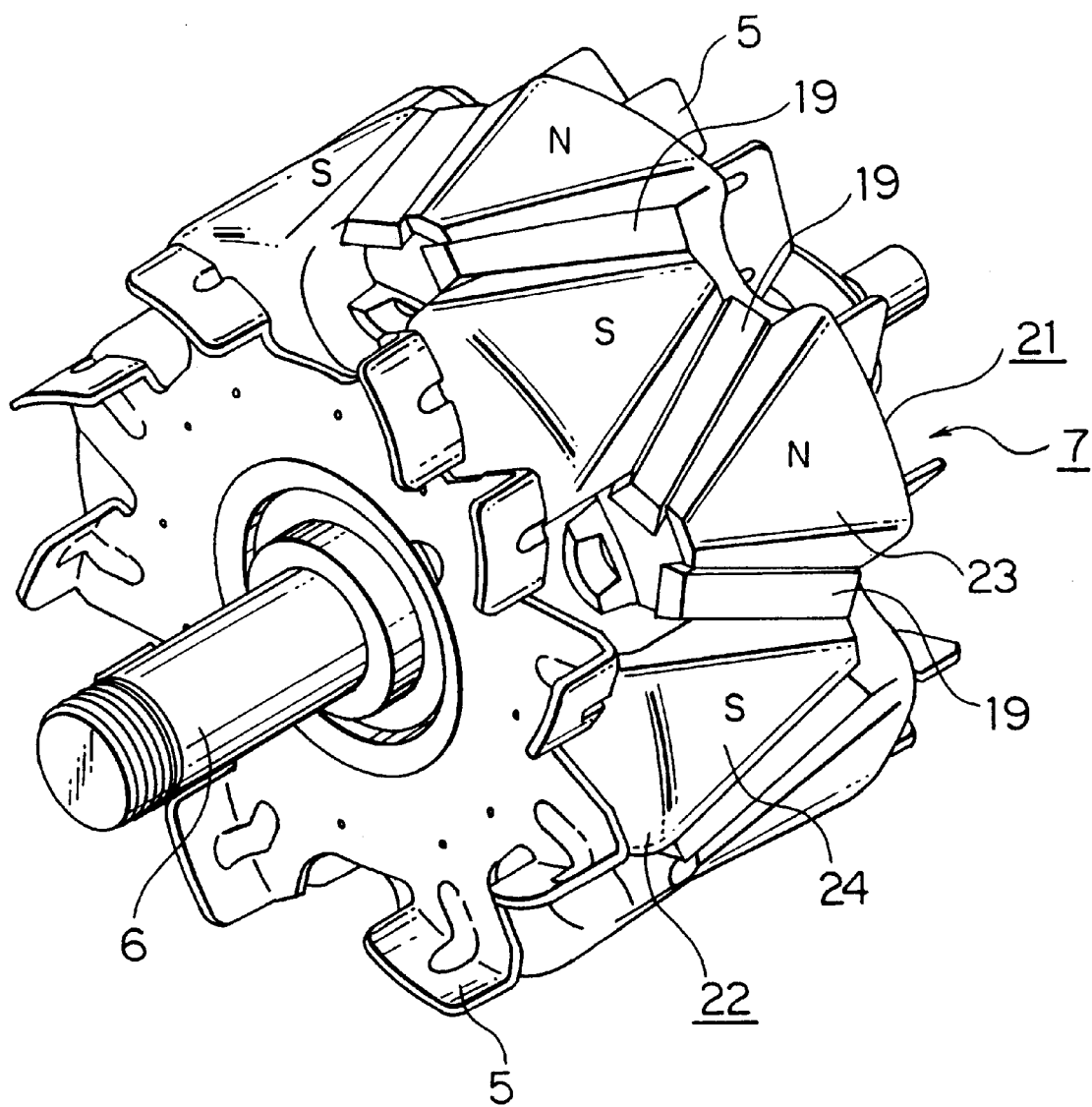
FIG. 13 is a perspective view illustrating the rotor shown in FIG. 12.
Figure 14:
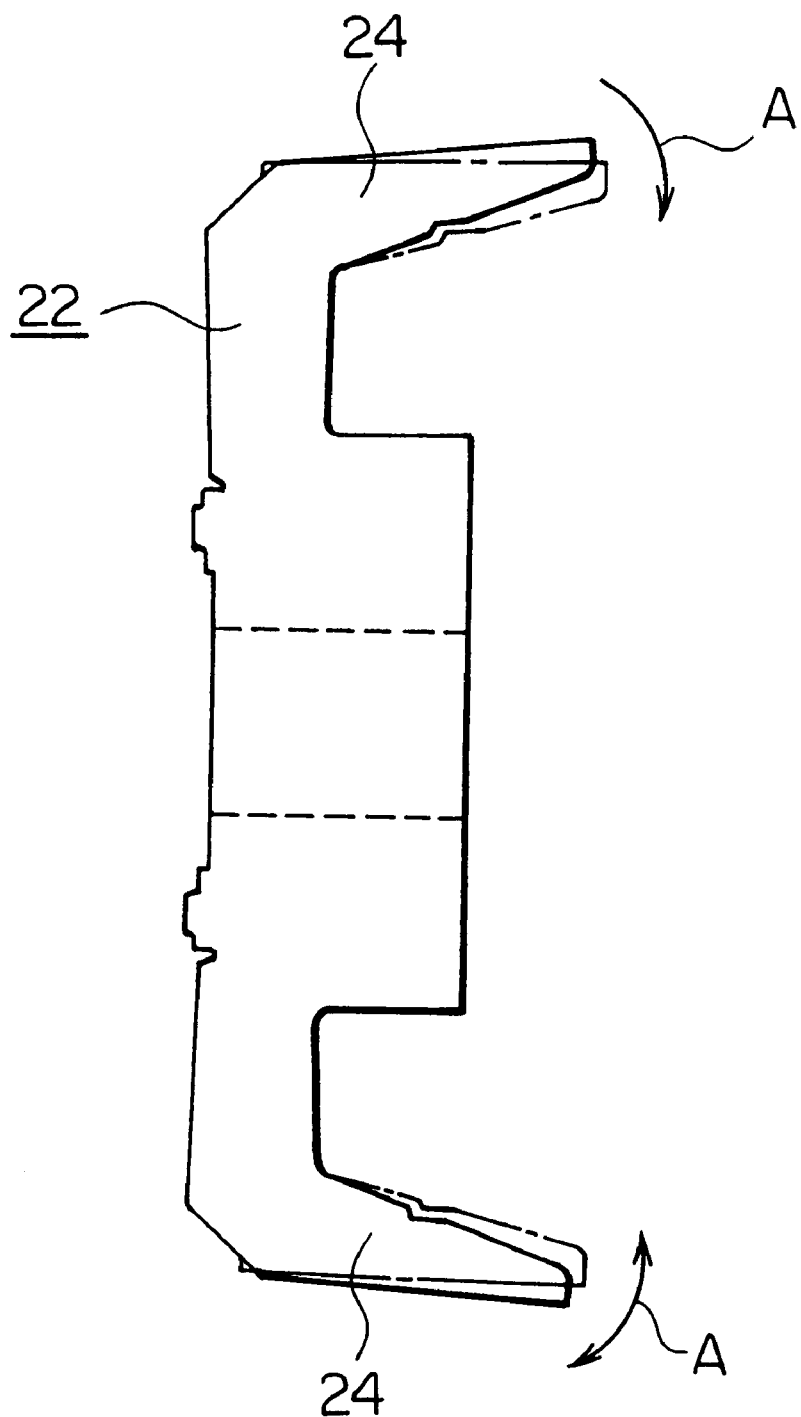
FIG. 14 is a side view illustrating a triangular magnetic pole shown in FIG. 12.

The rotor of the dynamo-electric machine in accordance with the present invention will now be explained; similar or corresponding parts shown in FIG. 12 to FIG. 14 will be assigned like reference numerals.

First Embodiment

Figure 1:
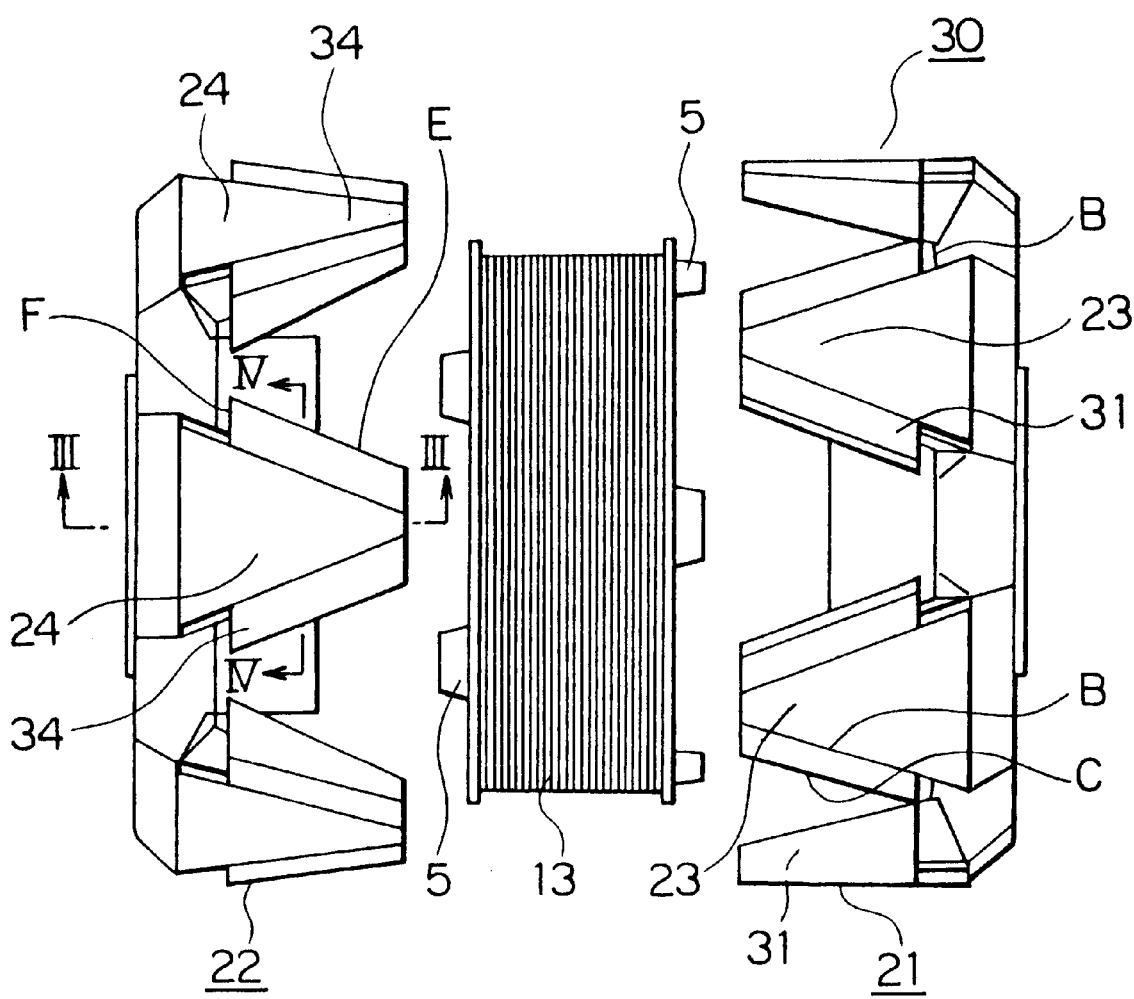
FIG. 1 is an assembly front view of a rotor of a vehicular AC generator of a first embodiment in accordance with the present invention.
Figure 2:
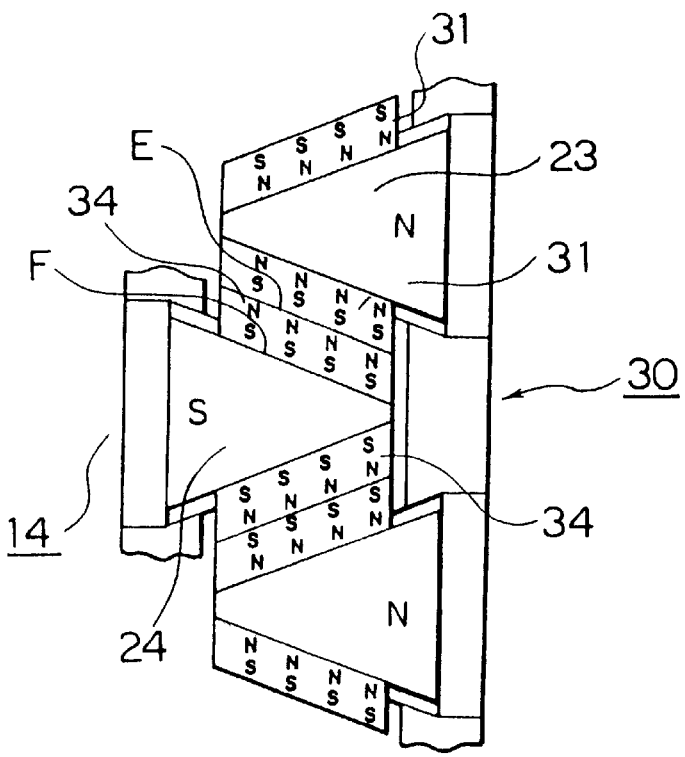
FIG. 2 is a front view of the rotor of the vehicular AC generator shown in FIG. 1.
Figure 3:
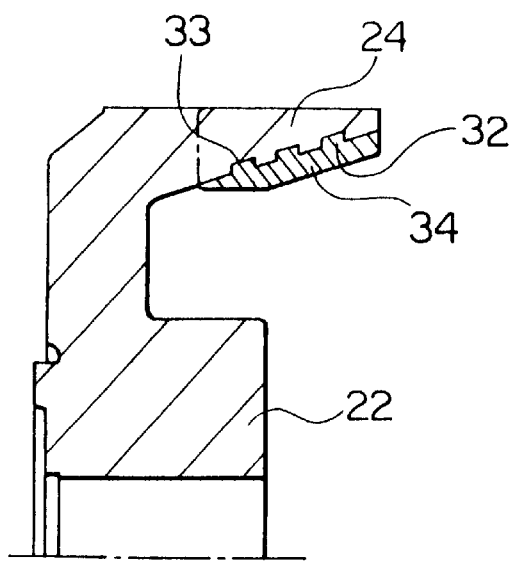
FIG. 3 is a sectional view at the line III—III of FIG. 1.
Figure 4:
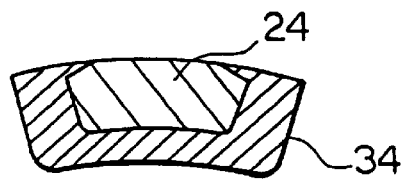
FIG. 4 is a sectional view at the line IV—IV of FIG. 1.

FIG. 1 is an assembly front view of a rotor of a vehicular AC generator in accordance with the present invention; FIG. 2 is a front view of the rotor shown in FIG. 1; FIG. 3 is a sectional view at the line III—III of FIG. 1; and FIG. 4 is a sectional view at the line IV—IV of FIG. 1.

The rotor 30 is provided with a rotor coil 13 through which current flows to generate magnetic flux, and a field core assembly 14 which is provided such that it covers the rotor coil 13 and in which magnetic poles are formed by magnetic flux. The field core assembly 14 is composed of a pair of first field core member 21 and second field core member 22 which are alternately meshed with each other. The first field core member 21 has triangular magnetic poles 23 made of iron, and the second field core member 22 has triangular magnetic poles 24 made of iron.

Each triangular magnetic pole 23 is provided with a first magnet section 31 such that a side surface C is parallel to a side surface B of the triangular magnetic pole 23. The first magnetic section 31 is disposed so as to reduce the leakage of the magnetic flux between the first triangular magnetic pole 23 and the second triangular magnetic pole 24. In other words, the first magnetic section 31 is disposed so that the N-pole surface thereof is opposed to the triangular magnetic pole 23 magnetized to the N pole.

As with the triangular magnetic pole 23, each triangular magnetic pole 24 is also provided with a second magnetic section 34 such that a side surface E is parallel to a side surface F of the triangular magnetic pole 24. The second magnetic section 34, which is in surface-contact with the first magnetic section 31, is also disposed so as to reduce the leakage of the magnetic flux between the first triangular magnetic pole 23 and the second triangular magnetic pole 24. In other words, the second magnetic section 34 is disposed so that the S-pole surface thereof is opposed to the triangular magnetic pole 24 magnetized to the S pole.

Formed on the inner surface of each triangular magnetic pole 24 is a recessed section 32 serving as a wedge-shaped portion to be engaged. The second magnetic section 34 composed of a resinous magnetic material and has a protuberance 33 which is engaged with the recessed section 32 and which, together with the recessed section 32, constitutes a securing means.

Formed also on the inner surface of each triangular magnetic pole 23 is a wedge-shaped recessed section. The first magnetic section 31 is composed of the same material as the second magnetic section 34 and has a protuberance which is engaged with the recessed section and which, together with the recessed section, constitutes a securing means.

The stator 8 is provided with a stator core 15, and a stator coil 16 which is composed of a conductor wound around the stator core 15 and in which alternating current is generated as the magnetic flux from the rotor coil 13 changes as the rotor 30 rotates.

In the vehicular AC generator configured as set forth above, current is supplied from a battery, not shown, to the rotor coil 13 via the brushes 10 and the slip ring 9 so as to generate magnetic flux; the N magnetic pole is formed on the triangular magnetic poles 23 of the first field core member 21, while the S magnetic pole is formed on the triangular magnetic poles 24 of the second field core member 22. The pulley 4 is driven by an engine and the rotor 30 is rotated through the shaft 6, so that a rotary magnetic field is imparted to the stator coil 16, thus generating an electromotive force in the stator coil 16. This AC electromotive force is rectified into direct current through the rectifier 12 and the magnitude thereof is adjusted by the regulator 18 before it is supplied to the battery.

When AC voltage is generated in the stator coil 16 as the rotor 7 rotates, constant magnetic repulsion is generated between the outer peripheral surface of the rotor 7 and the inner peripheral surface of the stator 8. When the triangular magnetic poles 23 are displaced by the magnetic repulsion, the first magnet sections 31 secured to the triangular magnetic poles 23 are also displaced, the first magnet sections 31 are not subjected to the load caused by the displacement of the triangular magnet poles 23, thus protecting the first magnet sections 31 from damage resulting from distortion or deformation. Likewise, when the triangular magnetic poles 24 are displaced, the second magnet sections 34 secured to the triangular magnetic poles 24 are also displaced, the second magnet sections 34 are not subjected to the load caused by the displacement of the triangular magnetic poles 24, thus protecting the second magnet sections 34 from damage.

Further, in the magnets which are disposed between the triangular magnetic poles 23 and 24 comprised of the first magnet sections 31 and the second magnet sections 34, the S pole of the first magnet sections 31 are held against the N pole of the second magnet sections 34. Hence, for example, when the magnetic repulsion acts to displace the triangular magnetic poles 23, an attractive magnetic force acting between the first magnet sections 31 and the second magnet sections 34 acts to restrain the displacement of the triangular magnetic poles 23.

The rotor 30 rotates at high speed and a centrifugal force acts on the triangular magnetic poles 23 and 24, and the magnets comprised of the first magnet sections 31 and the second magnet sections 34; however, the triangular magnetic poles 23 and 24, and the magnet sections 31 and 34 are joined by the securing means composed of the recessed section 32 and the protuberance 33 so that the magnet sections 31 and 34 do not detach during the rotation of the rotor 30. In particular, the triangular magnetic poles 23, 24 and the magnet sections 31, 34 are firmly joined, because the recessed section 32 is wedge-shaped.

In addition, the first magnet sections 31 and the second magnet sections 34 are composed of a light-weight resinous magnetic member, enabling the rotor 30 to be made lighter. Although the recessed sections 32 are wedge-shaped, the first magnet sections 31 and the second magnet sections 34 can be easily attached to the triangular magnetic poles 23 and 24 by injection molding.

Second Embodiment

Figure 5A:
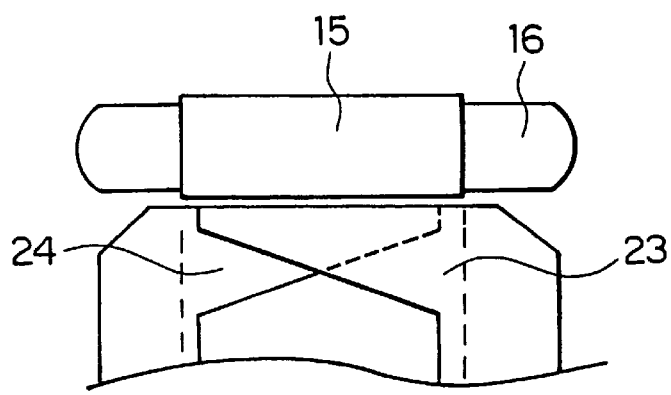
FIG. 5 is a diagram showing the density of the magnetic flux leakage between triangular magnetic poles in the axial direction of the rotor.
Figure 5B:
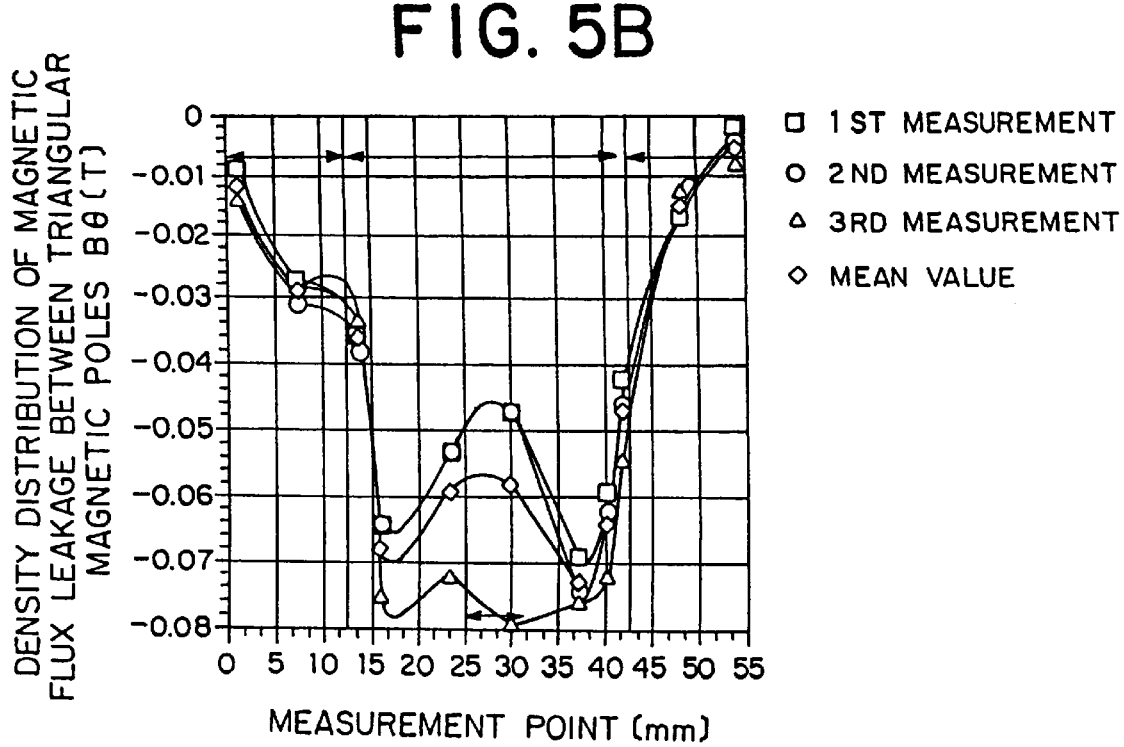

FIG. 5 is a diagram showing the magnetic flux leakage density in the circumferential direction between the triangular magnetic poles of the rotor of a vehicular AC generator. From this diagram, it can be seen that the magnetic flux leakage density is high at the base portion of the triangular magnetic poles of a field core member.

In the first embodiment, the leakage of magnetic flux in the space formed above the base portion is large. In the second embodiment, the leakage of magnetic flux in the space is reduced.

Figure 6:
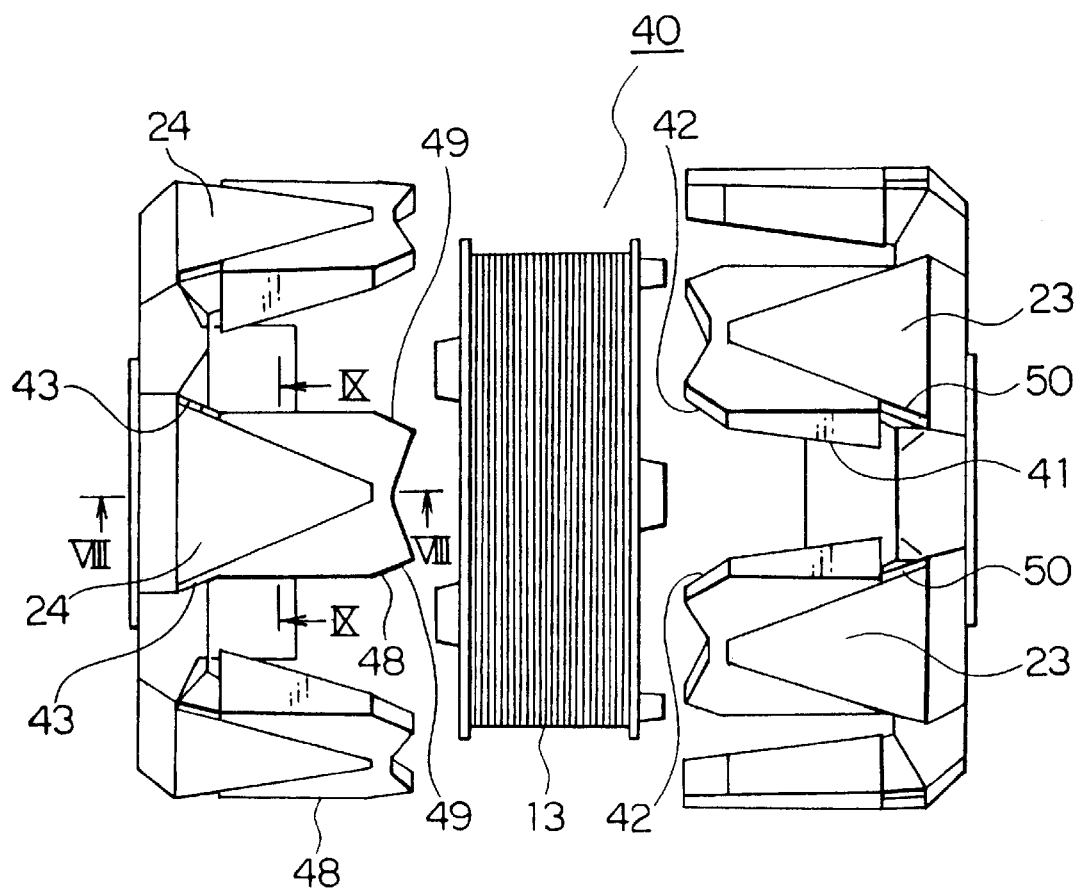
FIG. 6 is an assembly front view of the rotor of the vehicular AC generator of a second embodiment in accordance with the present invention.
Figure 7:
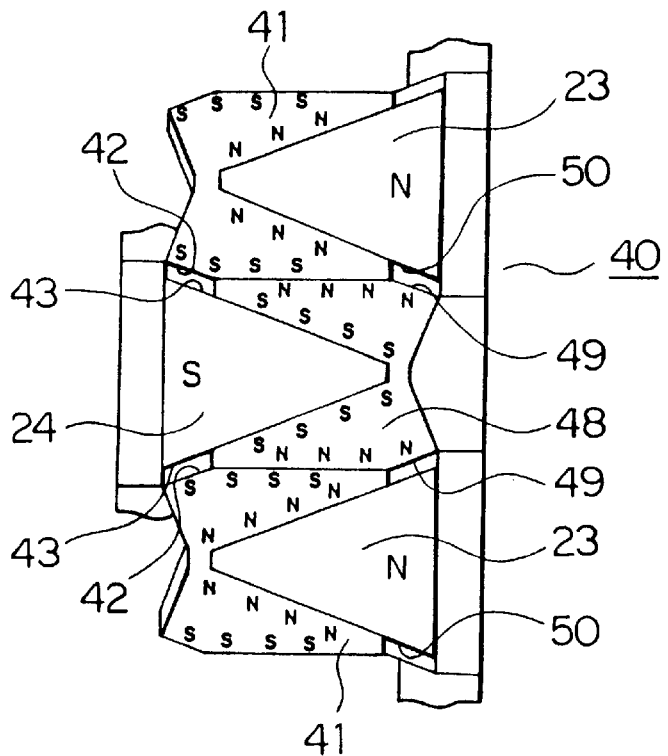
FIG. 7 is a front view of the dynamo-electric machine shown in FIG. 6.
Figure 8:
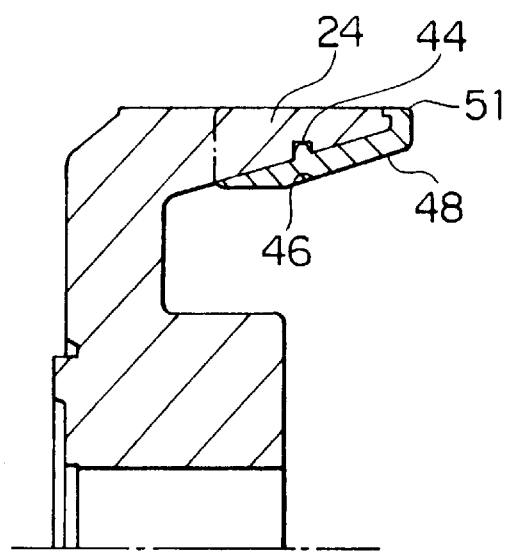
FIG. 8 is a sectional view at the line VIII—VIII of FIG. 6.
Figure 9:
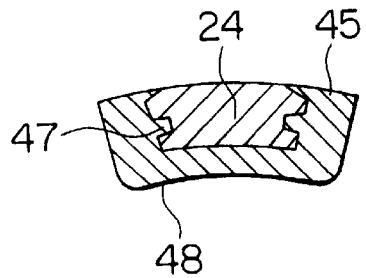
FIG. 9 is a sectional view at the line IX—IX of FIG. 6.

FIG. 6 is an assembly front view of a rotor of a vehicular AC generator of the second embodiment in accordance with the present invention; FIG. 7 is a front view of the rotor shown in FIG. 6; FIG. 8 is a sectional view at the line VIII—VIII of FIG. 6; and FIG. 9 is a sectional view at the line IX—IX of FIG. 6.

In a rotor 40 of this embodiment, each triangular magnetic pole 23 is provided with a first magnet section 41. A distal end 42 of the first magnet section 41 composed of a resinous magnetic member is disposed adjacent to a base portion 43 of the triangular magnetic poles 24 of the second field core member 22.

The first magnet sections 41 are disposed so as to reduce the leakage of the magnetic flux between the first triangular magnetic poles 23 and the second triangular magnetic poles 24. In other words, the first magnetic sections 41 are disposed so that the N-pole surface thereof are held against the triangular magnetic poles 23 magnetized to the N pole.

As with the case of the triangular magnetic poles 23, each triangular magnetic pole 24 is provided with a second magnet section 48. A distal end 49 of the second magnet section 48 composed of a resinous magnetic member is disposed adjacent to a base portion 50 of the triangular magnetic poles 23 of the first field core member 21.

The second magnet sections 48 in surface-contact with the first magnet sections 41 are disposed so as to reduce the leakage of the magnetic flux between the first triangular magnetic poles 23 and the second triangular magnetic poles 24. In other words, the second magnetic sections 48 are disposed so that the S-pole surfaces thereof are held against the triangular magnetic poles 24 magnetized to the S pole.

Formed on the inner surface of each triangular magnetic pole 24 is a recessed section 44 serving as a portion to be engaged; and formed on the side surface is a recessed section 45. The distal end of the triangular magnetic pole 24 is provided with a stepped portion 51. Formed on each second magnet section 48 is protuberances 46 and 47 which are snapped in the recessed sections 44 and 45 to constitute a securing means together with the recessed sections 44 and 45.

Likewise, the first magnet sections 41 and the triangular magnetic poles 23 are also provided with a securing means similar to that of the second magnet sections 48 and the triangular magnetic poles 24.

In the rotor 40 of the second embodiment, the distal ends 42 of the first magnet sections 41 are disposed adjacent to the base portions 43 of the second field core member 22, and the distal ends 49 of the second magnet section 48 are disposed adjacent to the base portions 50 of the first field core member 21. This makes it possible to prevent the leakage of magnetic flux also at the base portions 43 and 50 of the field core members 21 and 22, respectively, as compared with the rotor 30 of the first embodiment. Thus, the second embodiment is able to further reduce the leakage of magnetic flux between the triangular magnetic poles 23 and 24.

Figure 10:
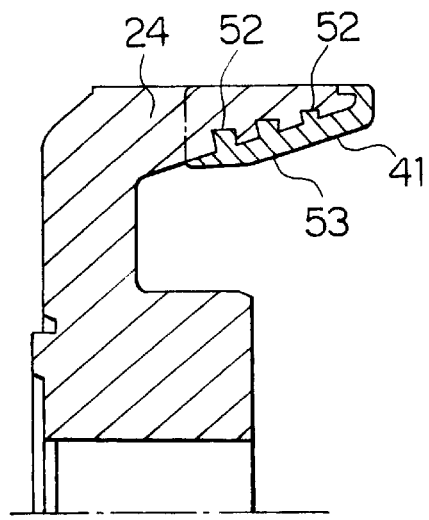
FIG. 10 is a sectional view showing an essential section of another securing means for securing the triangular magnetic poles and magnet sections.

A plurality of recessed sections 52 serving as the wedge-shaped sections to be engaged may be formed on the inner surface of each triangular magnetic pole 24 as shown in FIG. 10, and the protuberances 53 of the first magnet section 41 may be engaged the recessed sections 52. Alternatively, a protuberance serving as an engaging section may be formed on each triangular magnetic pole, and a recessed section serving as a section to be engaged may be formed on each magnet section.

Third Embodiment

Figure 11:
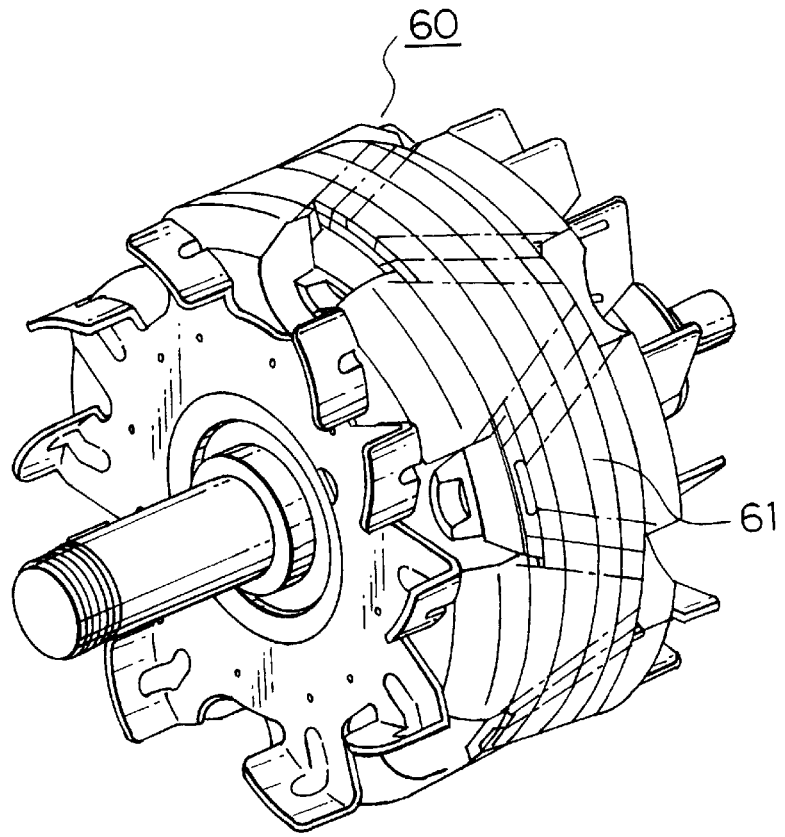
FIG. 11 is a perspective view illustrating the rotor of the vehicular AC generator of a third embodiment in accordance with the present invention.

FIG. 11 is a perspective view of a rotor 60 of a dynamo-electric machine according to a third embodiment of the present invention. The outer peripheral portion of the rotor 60 of the third embodiment is wrapped with a nonmagnetic tape 61 which employs a carbon fiber as a base material and which is impregnated with resin. This makes it possible to reliably control the displacement of the triangular magnetic poles 23, 24, the first magnet sections 31, and the second magnet sections 34 when the rotor 60 rotates.

In the embodiments explained above, the rotor for a vehicular AC generator has been used as the rotor of a dynamo-electric machine. The present invention, however, is not limited thereto; it may be also applied to, for example, the rotor of an electric motor.

Thus, the rotor for a dynamo-electric machine in accordance with the present invention is equipped with: a rotor coil through which current flows to generate magnetic flux; a field core assembly which is provided such that it covers the rotor coil and which is composed of a first field core member and a second field core member which respectively have triangular magnetic poles alternately meshed with each other; and a plurality of magnets which are disposed between adjacent the triangular magnetic poles which are magnetized in directions that reduce the leakage of the magnetic flux of the triangular magnetic poles; wherein each of the magnets is comprised of a first magnet section secured by securing means to the triangular magnetic pole of the first field core member and a second magnet section secured by securing means to the triangular magnet pole of the second field core member. Therefore, whenever the triangular magnetic poles are displaced by the magnetic repulsion, between the outer peripheral surface of the rotor and the inner peripheral surface of the stator, which is generated by the AC voltage produced when the rotor rotates, the first magnet sections and the second magnet sections secured to the triangular magnetic poles are also displaced, so that the displacement of the triangular magnetic poles does not cause load to be applied to the first magnet sections or the second magnet sections. This protects the first magnet sections and the second magnet sections from damage resulting from distortion or deformation thereof.

The first magnet sections and the second magnet sections are held against each other, between the triangular magnetic poles, have opposite polarities. Hence, when magnetic repulsion acts to displace the triangular magnetic poles, the attractive magnetic force acting between the first magnet sections and the second magnet sections suppresses the displacement of the triangular magnetic poles.

Further, with the rotor for a dynamo-electric machine according to the present invention, the distal ends of the second magnet sections secured to the second field core member are disposed adjacent to the base portions of the triangular magnetic poles of the first field core member, and the distal ends of the first magnet sections secured to the first field core member are disposed adjacent to the base portions of the triangular magnetic poles of the second field core member; hence, the leakage of the magnetic flux at the base portions where the leakage of magnetic flux is large can be decreased, leading to higher power generating efficiency.

Moreover, in the rotor for a dynamo-electric machine according to the present invention, the securing means is constructed by the protuberance serving as the engaging section and a recessed section serving as the section to be engaged, thus allowing the first magnet sections and the second magnet sections to be secured easily to the triangular magnetic poles. After the first magnet sections and the second magnet sections have been secured to the triangular magnetic poles, the first field core member and the first magnet sections can be handled as a single component, and the second field core member and the second magnet sections can be also handled as a single component, permitting a simplified process for assembling the rotor.

In addition, with the rotor for a dynamo-electric machine according to the present invention, the outer peripheral surface thereof is wrapped with a tape composed of a nonmagnetic material, so that the displacement of the triangular magnetic poles and the magnets caused by the rotation of the rotor can be restrained, resulting in higher resistance to centrifugal force.

Further, with the rotor for a dynamo-electric machine according to the present invention, the tape employs a carbon fiber as the base material and is impregnated with resin. This enables the required insulation and mechanical strength to be achieved at a lower cost.

What is claimed is:

1. A rotor for a dynamo-electric machine, said rotor comprising:

a rotor coil through which current flows to generate magnetic flux;

a field core assembly which is provided such that it covers said rotor coil and which is composed of a first field core member and a second field core member respectively having triangular magnetic poles alternately meshed with each other; and a plurality of magnets which are disposed between adjacent said triangular magnetic poles and which are magnetized in a direction that reduces the leakage of the magnetic flux between said triangular magnetic poles;

wherein each of said plurality of magnets is composed of a first magnet section secured by securing means to said triangular magnetic pole of said first field core member, and a second magnet section secured by securing means to said triangular magnetic pole of said second field core member.

2. A rotor for a dynamo-electric machine according to claim 1, wherein a distal end of said second magnet section secured to the second field core member is adjacent to a base portion of the triangular magnetic poles of the first field core member, while a distal end of the first magnet section secured to the first field core member is adjacent to a base portion of the triangular magnetic poles of the second field core member.

3. A rotor for a dynamo-electric machine according to claim 1, wherein the securing means is comprised of a protuberance serving as an engaging portion and a recessed portion serving as a mating portion meshed with the engaging portion.

4. A rotor for a dynamo-electric machine according to claim 1, wherein the outer peripheral surface thereof is wrapped with a tape composed of a nonmagnetic material.

5. A rotor for a dynamo-electric machine according to claim 4, wherein the tape employs a carbon fiber as a base material and is impregnated with resin.

* * * * *